United States Patent
Suzuki

(10) Patent No.: US 11,100,924 B2
(45) Date of Patent: *Aug. 24, 2021

(54) SERVICE PROVIDING DEVICE, NON-TRANSITORY COMPUTER-READABLE STORAGE MEDIUM STORING SERVICE PROVIDING PROGRAM AND SERVICE PROVIDING METHOD

(71) Applicant: TOYOTA JIDOSHA KABUSHIKI KAISHA, Toyota (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

This patent is subject to a terminal disclaimer.

(21) Appl. No.: 16/198,380

(22) Filed: Nov. 21, 2018

(65) Prior Publication Data

US 2019/0180745 A1    Jun. 13, 2019

(30) Foreign Application Priority Data

Dec. 11, 2017   (JP) .............................. JP2017-236653

(51) Int. Cl.
*G10L 15/22*   (2006.01)
*H04W 4/024*   (2018.01)
(Continued)

(52) U.S. Cl.
CPC .............. *G10L 15/22* (2013.01); *H04L 67/16* (2013.01); *H04L 67/322* (2013.01);
(Continued)

(58) Field of Classification Search
CPC ... G10L 15/265; G06F 3/167; G06F 15/7867; B60K 2370/11; H04N 21/2146; H04W 4/024

See application file for complete search history.

(56) References Cited

U.S. PATENT DOCUMENTS 7,398,209 B2    7/2008  Kennewick et al.
9,361,084 B1*   6/2016  Costa ........................ G06F 8/61
(Continued)

FOREIGN PATENT DOCUMENTS

JP    2015-069103 A    4/2015

OTHER PUBLICATIONS

United States Patent and Trademark Office, Non-Final Office Action issued to U.S. Appl. No. 16/126,519 dated Jul. 24, 2020, 12 pages.
(Continued)

*Primary Examiner* — Thomas H Maung
(74) *Attorney, Agent, or Firm* — Hunton Andrews Kurth LLP

(57) ABSTRACT

An input item information DB stores input items and weighting factors for each service based on voice recognition, a specifying unit specifies the input items based on uttered information, a storage unit stores the uttered information for the specified input items, a calculation unit calculates a score for each service based on all the input items for which the uttered information is stored and the weighting factors, and a request unit requests a user to utter information for an uninput item for which the uttered information has yet to be stored in the service having the highest score. The request unit requests the user to utter the information for the uninput item for a service having the least number of uninput items in the indispensable input items or having the highest ratio of input for the indispensable input items among the services having the highest score.

12 Claims, 2 Drawing Sheets

(51) Int. Cl.
*H04L 29/08* (2006.01)
*G01C 21/36* (2006.01)

(52) U.S. Cl.
CPC ........ *H04W 4/024* (2018.02); *G01C 21/3608* (2013.01); *G10L 2015/223* (2013.01)

(56) References Cited

U.S. PATENT DOCUMENTS

| | | | |
|---|---|---|---|
| 9,384,732 | B2 | 7/2016 | Bishop et al. |
| 9,922,642 | B2 | 3/2018 | Pitschel et al. |
| 2005/0216271 | A1 | 9/2005 | Konig |
| 2006/0258377 | A1 | 11/2006 | Economos et al. |
| 2013/0311997 | A1* | 11/2013 | Gruber ................. G06Q 10/10 718/102 |
| 2014/0244249 | A1 | 8/2014 | Mohamed et al. |
| 2015/0039292 | A1 | 2/2015 | Suleman et al. |
| 2016/0042735 | A1 | 2/2016 | Vibbert et al. |
| 2018/0342241 | A1 | 11/2018 | Qu et al. |

OTHER PUBLICATIONS

U.S. Appl. No. 16/126,519, filed Sep. 10, 2018, 17 pages.
United States Patent and Trademark Office, Non-Final Office Action issued to U.S. Appl. No. 16/126,519 dated Dec. 2, 2019, 12 pages.
United States Patent and Trademark Office, Advisory Action issued to U.S. Appl. No. 16/126,519 dated Jun. 15, 2020, 4 pages.
United States Patent and Trademark Office, Final Office Action issued to U.S. Appl. No. 16/126,519 dated Mar. 2020, 11 pages.
Final Office Action, United States Patent and Trademark Office issued to U.S. Appl. No. 16/126,519 dated Jan. 13, 2021, 14 pages.
Advisory Action, United States Patent and Trademark Office, issued to U.S. Appl. No. 16/126,519 dated Apr. 20, 2021, 4 pages.
Non-Final Office Action, United States Patent and Trademark Office, issued to U.S. Appl. No. 16/126,519 dated Jun. 2, 2021, 18 pages.
Haradawar, D., "Driving App Waze Builds its own Siri for Hands-Free Voice Control", Feb. 9, 2012, http://venturebeat.com/2012/02/09/driving-app-waze-builds-itsown-siri-for-hands-freevoice-control/, 5 pages.

* cited by examiner

FIG. 2A

| SERVICE: SCHEDULE MANAGEMENT | | | |
|---|---|---|---|
| ITEM NAME | WEIGHTING FACTOR | INDISPENSABILITY | STORAGE STATUS |
| START TIME | 3 | INDISPENSABLE | STORED |
| END TIME | 3 | INDISPENSABLE | NOT STORED |
| PURPOSE | 1 | | NOT STORED |
| PLACE | 2 | | NOT STORED |

FIG. 2B

| SERVICE: NAVIGATION (ROUTE SEARCH) | | | |
|---|---|---|---|
| ITEM NAME | WEIGHTING FACTOR | INDISPENSABILITY | STORAGE STATUS |
| DEPARTURE TIME | 3 | OR | STORED |
| ARRIVAL TIME | | | |
| DEPARTURE PLACE | 1 | | NOT STORED |
| DESTINATION | 3 | INDISPENSABLE | NOT STORED |
| MEANS OF TRANSPORTATION | 3 | INDISPENSABLE | NOT STORED |

SERVICE PROVIDING DEVICE, NON-TRANSITORY COMPUTER-READABLE STORAGE MEDIUM STORING SERVICE PROVIDING PROGRAM AND SERVICE PROVIDING METHOD

INCORPORATION BY REFERENCE

The disclosure of Japanese Patent Application No. 2017-236653 filed on Dec. 11, 2017 including the specification, drawings and abstract is incorporated herein by reference in its entirety.

BACKGROUND

1. Technical Field

The present disclosure relates to a service providing device, a non-transitory computer-readable storage medium storing a service providing program and a service providing method.

2. Description of Related Art

Japanese Unexamined Patent Application Publication No. 2015-69103 (JP 2015-69103 A) describes an information processing device that executes a voice search based on an input voice. According to JP 2015-69103 A, when input information does not meet search requirements and the voice search cannot be executed, the device prompts the user to supply the missing information to automatically supplement the information required for the search.

SUMMARY

In JP 2015-69103 A, the voice search is specified as a service to be provided by the information processing device. Thus, the user does not need to designate a type of service when using the voice search. However, when there are a plurality of types of services to be provided to the user, conditions required when the services are provided differ between services. In this case, when the user uses the services, the user needs to utter words after designating the type of the service to be used, which causes inconvenience to users.

The present disclosure provides a service providing device, a non-transitory computer-readable storage medium storing a service providing program and a service providing method to improve convenience for users.

A first aspect of the disclosure relates to a service providing device that identifies a user's voice and provides a service based on the user's voice. The service providing device includes a storing unit configured to store, for each service, a plurality of input items required for providing the service to the user and individual weighting factors assigned to the corresponding input items, a specifying unit configured to specify, based on uttered information uttered by the user, the input items for which the uttered information is stored, a storage unit configured to store the uttered information for the input items specified by the specifying unit, a calculation unit configured to calculate a score for each service based on all of the input items for which the uttered information is stored and the individual weighting factors assigned to the corresponding input items, and a request unit configured to request the user, when there is an uninput item for which the uttered information has not been stored with respect to the service having the highest score calculated by the calculation unit, to utter information for the uninput item. When there are a plurality of the services having the highest score calculated, the request unit requests the user to utter the information for the uninput item with respect to either one of a service having the least number of uninput items in indispensable input items, among the input items, for which input is indispensable, and a service having the highest ratio of input for the indispensable input items, among the plurality of the services.

According to the first aspect of the disclosure, the request unit may be configured to request the user, when there are a plurality of the services having the least number of uninput items in the indispensable input items or when there are a plurality of the services having the highest ratio of input for the indispensable input items, to utter the information for the uninput item with respect to a service having the highest priority within priorities set for each service among the plurality of the services.

According to the first aspect of the disclosure, the request unit may be configured to request the user, when there are a plurality of the services having the least number of uninput items in the indispensable input items or when there are a plurality of the services having the highest ratio of input for the indispensable input items, to utter the information for the uninput item with respect to a service having the highest priority within priorities of the services set for each type of terminal used by the user among the plurality of the services.

The service providing device according to the first aspect may further include an adjusting unit configured to set the priority of the service for which utterance is requested to be lower than the priorities of other services, when a user answer from the user in response to a request of utterance differs from an answer assumed.

According to the first aspect of the disclosure, the request unit may be configured to request the user, when there are a plurality of the services having the least number of uninput items in the indispensable input items or when there are a plurality of the services having the highest ratio of input for the indispensable input items, to utter the information for the uninput item with respect to a service having the highest number of records of use by the user among the plurality of the services.

According to the first aspect of the disclosure, the request unit may be configured to request the user, when there are a plurality of the services having the least number of uninput items in the indispensable input items or when there are a plurality of the services having the highest ratio of input for the indispensable input items, to utter the information for the uninput item with respect to a service having the most recent record of use by the user among the plurality of the services.

According to the first aspect of the disclosure, the request unit may be configured to request the user, when there are a plurality of the services having the least number of uninput items in the indispensable input items or when there are a plurality of the services having the highest ratio of input for the indispensable input items, to utter the information for the uninput item with respect to a service having the highest number of records of use by all users among the plurality of the services.

The service providing device according to the first aspect may further include a providing unit configured to provide, when there is a service for which the uttered information is stored with respect to all of the indispensable input items, the service to the user.

According to the first aspect of the disclosure, the service may include a service in which a schedule is registered in a schedule table of the user or a service in which a navigation screen is displayed on an information terminal of the user to provide a travel route guidance.

A second aspect of the disclosure relates to a non-transitory computer-readable storage medium storing a service providing program for providing a service to a user. The service providing program causes a computer to: identify a user's voice and store, for each service, a plurality of input items required for providing the service based on the user's voice and individual weighting factors assigned to the corresponding input items, specify, based on uttered information uttered by the user, the input items for which the uttered information is stored, store the uttered information for the input items specified, calculate a score for each service based on all of the input items for which the uttered information is stored and the individual weighting factors assigned to the corresponding input items, and request the user, when there is an uninput item for which the uttered information has not been stored with respect to the service having the highest score calculated, to utter the information for the uninput item. When there are a plurality of the services having the highest score calculated, the computer requests the user to utter the information for the uninput item for either one of a service having the least number of uninput items in indispensable input items, among the input items, for which input is indispensable, and a service having the highest ratio of input for the indispensable input items, among the plurality of the services.

A third aspect of the disclosure relates to a service providing method that identifies a user's voice and provides a service based on the user's voice. The service providing method selects, as a desired service desired by the user, either one of a service having the least number of uninput items in indispensable input items for which input is indispensable, and a service having the highest ratio of input for the indispensable input items, among a plurality of the services based on information uttered by a user, and requests the user to utter the information for the uninput items.

The disclosure can provide a service providing device, a non-transitory computer-readable storage medium storing a service providing system, and a service providing method to improve convenience for users.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2A is a diagram illustrating input item information stored in an input item information database (DB), when a service provided is schedule management; and FIG. 2B is a diagram illustrating the input item information stored in the input item information DB, when the service provided is navigation.

DETAILED DESCRIPTION OF EMBODIMENTS

Figure 1:
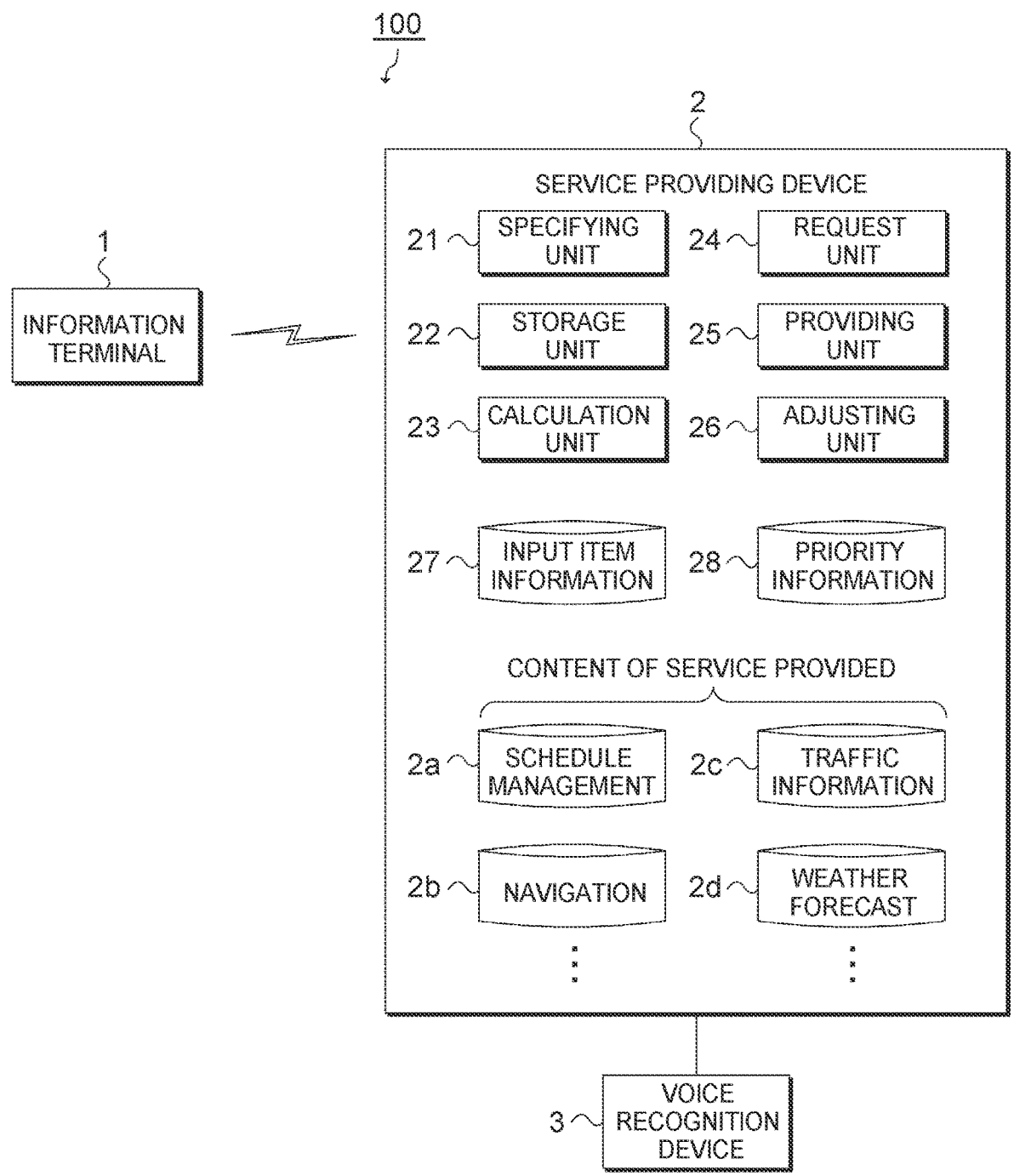
FIG. 1 is a diagram illustrating a configuration of a service providing system including a service providing device according to an embodiment.

A preferred embodiment will be described below with reference to the accompanying drawings. In the respective drawings, units denoted with the same reference numerals have the same or similar configuration.

A configuration of a service providing system including a service providing device according to an embodiment will be described with reference to FIG. 1. A service providing system 100 includes an information terminal 1 that is used by a user, and a service providing device 2 and a voice recognition device 3 disposed in a data center or the like. The information terminal 1 and the service providing device 2, and the service providing device 2 and the voice recognition device 3 are configured to be able to communicate with each other over a network. The network may be a wired network, a wireless network, or a combination of the wired network and the wireless network. In this embodiment, as an example, a network including a wireless network is used between the information terminal 1 and the service providing device 2, and a wired network is used between the service providing device 2 and the voice recognition device 3.

The information terminal 1 illustrated in FIG. 1 is a tablet type terminal device including mobile phones represented by a smartphone. The information terminal 1 includes, for example, a control unit including a central processing unit (CPU) and a memory, an operation unit, a display, a storage unit, and a communication unit as a physical configuration. Various functions incorporated in the information terminal 1 are implemented when the CPU executes a predetermined program stored in the memory.

The service providing device 2 includes, for example, a specifying unit 21, a storage unit 22, a calculation unit 23, a request unit 24, a providing unit 25, and an adjusting unit 26 as a functional configuration. The service providing device 2 includes, for example, a control unit including a CPU and a memory, a storage device, and a communication device as a physical configuration. The CPU executes the predetermined program stored in the memory so that respective functions of the specifying unit 21, the storage unit 22, the calculation unit 23, the request unit 24, the providing unit 25, and the adjusting unit 26 are implemented. Details of the respective functions will be described later.

An input item information database (DB) 27 stores, for each service, input item information including input items required for providing services based on voice recognition. For example, the services include schedule management, navigation, traffic information, and weather forecast. Content required for providing each service is stored in a database of the service providing device 2. Examples of the database for storing the content include a schedule management DB 2a, a navigation DB 2b, a traffic information DB 2c, and a weather forecast DB 2d.

FIGS. 2A and 2B illustrate data items included in the input item information DB 27, such as an item name, a weighting factor, indispensability, and a storage status. The item name is a name for specifying the input item. The weighting factor is a coefficient for weighting the input item when a score described later is calculated. The indispensability is information indicating whether an input for the input item is indispensable for receiving the service. The storage status is information indicating whether information uttered by the user (hereinafter also referred to as "uttered information") based on the input item is stored.

The input item information stored in the input item information DB 27 will be described in detail with reference to FIGS. 2A and 2B. FIG. 2A illustrates the input item information when the service provided is schedule management, and FIG. 2B illustrates the input item information when the service provided is navigation (route search).

As illustrated in FIG. 2A, a start time, an end time, a purpose, and a place are set as item names that are items to be input for receiving the schedule management service. "Three (3)" is set as a weighting factor for each of the start time and the end time, "1" is set as a weighting factor for the purpose, and "2" is set as a weighting factor for the place. Among the input items, the start time and the end time are set as items for which an input is indispensable (indispensable input items) for receiving the schedule management service. FIG. 2A illustrates a state where, among the input items, the uttered information of the start time is already stored, while the uttered information of the other items has yet to be stored (uninput items).

As illustrated in FIG. 2B, a departure time, an arrival time, a departure place, a destination, and means of transportation are set as item names of items to be input for receiving the navigation service. "Three (3)" is set as the weighting factor for each of the departure time, the arrival time, the destination, and the means of transportation, and "1" is set as the weighting factor for the departure place. Among the input items, the departure time, the arrival time, the destination, and the means of transportation are set as items for which an input is indispensable for receiving the navigation service.

A mark "OR" shown in the indispensability, which is set in two or more item names, indicates that any one of the input items is an indispensable input item. FIG. 2B shows that input for either one of the departure time and the arrival time is indispensable. FIG. 2B illustrates a state where, among the input items, the uttered information of either one of the departure time and the arrival time is already stored, and the uttered information of the other items has yet to be stored.

Further description will be made referring back to FIG. 1. Each function of the service providing device 2 will be described in order. The specifying unit 21 receives information uttered by the user from the information terminal 1 and specifies an input item for which the received uttered information is stored. A procedure of specifying the input item will be specifically described below.

First, the specifying unit 21 transmits a voice received from the information terminal 1 to the voice recognition device 3. The voice recognition device 3 analyzes the received voice, converts the voice into text, and transmits the text to the service providing device 2. The voice analysis can be performed using a known voice analysis scheme.

Subsequently, the specifying unit 21 determines which item name, among the item names provided for each service, corresponds to the uttered information in the text received from the voice recognition device 3, and specifies the input item for which the uttered information is stored.

The storage unit 22 stores the uttered information for the input item specified by the specifying unit 21.

The calculation unit 23 calculates a score for each service based on all input items for which the uttered information is stored and weighting factors corresponding to the input items. A specific example of a procedure of calculating the score will be described below.

For example, when the information uttered by the user is "from 9 o'clock to 12 o'clock", the uttered information is stored for the start time and the end time among the input items of the schedule management service illustrated in FIG. 2A. In this case, a weighting factor "3" of the start time+a weighting factor "3" of the end time="6" becomes the score of the schedule management service. Meanwhile, in the navigation service illustrated in FIG. 2B, the uttered information is stored for the departure time or the arrival time among the input items. In this case, the weighting factor "3" of the departure time or the arrival time becomes the score of the navigation service.

For example, when the information uttered by the user is "to Nagoya Station at 12 o'clock", the uttered information is stored for the end time and the place among the input items in the schedule management service illustrated in FIG. 2A. In this case, a weighting factor "3" of the end time+a weighting factor "2" of the place="5" becomes the score of the schedule management service. Meanwhile, in the navigation service illustrated in FIG. 2B, the uttered information is stored for the arrival time and the destination among the input items. In this case, a weighting factor "3" of the arrival time+a weighting factor "3" of the destination="6" becomes the score of the navigation service.

When there is an input item for which the uttered information has yet to be stored with respect to the service having the highest score calculated by the calculation unit 23, the request unit 24 illustrated in FIG. 1 requests the user to utter information for the uninput item. Questions to be asked to the user when requesting the user to utter the information for the uninput item will be specifically described below.

For example, in a case where the service having the highest score is the schedule management service and the uninput items are the purpose and the place among the input items, a question "Where do you want to go (place) and what do you want to do (purpose)?" is given to the user. In a case where the service having the highest score is the navigation service and the uninput item is the departure place among the input items, a question "Where do you plan to depart from?" is given to the user.

When there are a plurality of services having the highest score calculated by the calculation unit 23, the request unit 24 selects either one of (a) a service having the least number of uninput items among the indispensable input items, and (b) a service having the highest ratio of input for the indispensable input items, and requests the user to utter the information for the uninput item for the selected service. Specific examples of the above (a) and (b) are described below.

(a) Suppose the information uttered by the user is "from 9 o'clock", for example. In this case, one item, which is the end time, is the uninput item among the indispensable input items in the schedule management service illustrated in FIG. 2A. Two items, which are the destination and the means of transportation, are the uninput items among the indispensable input items in the navigation service illustrated in FIG. 2B. In this case, the service having the least number of uninput items among the indispensable input items is the schedule management service. Therefore, the request unit 24 requests the user to utter the information for the uninput item with respect to the schedule management service.

(b) Suppose the information uttered by the user is "to Nagoya Station at 12 o'clock", for example. In this case, the ratio of input for the indispensable input items with respect to the schedule management service illustrated in FIG. 2A is ½=0.5. The ratio of input for the indispensable input items with respect to the navigation service illustrated in FIG. 2B is ⅔=0.67. In this case, the service having the highest ratio of input for the indispensable input items is the navigation service. Therefore, the request unit 24 requests the user to utter the information for the uninput item with respect to the navigation (route search) service.

When there are a plurality of services having the least number of uninput items among the indispensable input items or when there are a plurality of services having the highest ratio of input for the indispensable input items, the request unit 24 illustrated in FIG. 1 narrows the service by selecting any one of the following services (1) to (5). In this case, the request unit 24 requests the user to utter the information for the uninput item of the selected service.

(1) The service having the highest priority within the priorities set for each service (2) The service having the highest number of records of use by the user The condition in (2) is particularly effective when the priority described above in (1) is not set.

(3) The service having the most recent record of use by the user The condition in (3) is particularly effective when the priority described above in (1) is not set.

(4) The service having the highest number of records of use by all users Here, "all users" refer to, for example, all users belonging to each attribute when users are categorized by attributes such as gender and age.

(5) The service having the highest priority within the priorities of the service set for each type of terminal used by the user For example, when the type of the information terminal 1 is a smartphone, the priority of the schedule management service is set higher than the priorities of the other services. When the type of the information terminal 1 is a navigation terminal, the priorities of the route search service and the traffic information service are set higher than the priorities of the other services.

When there is a service for which the uttered information is stored with respect to all of the input items, the providing unit 25 provides the corresponding service to the user. For example, when the uttered information is stored for all of the input items of the schedule management service, a schedule is registered in the schedule table of the user. Meanwhile, when the uttered information is stored for all of the input items of the navigation service, a navigation screen is displayed on the information terminal 1 of the user so as to provide a travel route guidance.

Alternatively, the service may be provided to the user when the uttered information is stored for all of the indispensable input items of the service. For example, the schedule may be registered in the schedule table of the user when the uttered information is stored for the start time and the end time, which are indispensable input items of the schedule management service. The navigation screen may be displayed on the information terminal 1 of the user to provide a travel route guidance when the uttered information is stored for the departure time or the arrival time, the destination, and the means of transportation, which are indispensable input items of the navigation service.

When an answer from the user in response to the request of utterance differs from the answer assumed, the adjusting unit 26 sets the priority of the assumed service (priorities of the above (1) and (5), for example) lower than the priorities of the other services. Examples of the case in which the answer from the user differs from the answer assumed include a case in which the answer from the user is not included in (is not similar to) patterns of answers set in advance for each input item, and a case in which the answer from the user matches an input item that is different from the input item assumed.

As described above, the service providing system 100 according to the embodiment can specify the input items for which uttered information is stored based on the information uttered by the user, store the uttered information for the specified input item, calculate a score for each service based on all of the input items for which the uttered information is stored and the weighting factors corresponding to the input items, and request the user to utter the information for the uninput item when there is an input item for which the uttered information has yet to be stored with respect to the service having the highest calculated score.

In addition, when there are the plurality of services having the highest score, the service providing system 100 selects either one of the service having the least number of uninput items in the indispensable input items, and the service having the highest ratio of input for the indispensable input items, and requests the user to utter the information for the uninput item with respect to the selected service.

Furthermore, there are cases in which there exists the plurality of services having the least number of uninput items in the indispensable input items or the plurality of services having the highest ratio of input for the indispensable input items. In this case, among the plurality of the services, the service providing system 100 selects any one of the service having the highest priority within the priorities set for each service, the service having the highest priority within the priorities of the services set for each type of terminal used by the user, the service having the highest number of records of use by the user, the service having the most recent record of use by the user, and the service having the highest number of records of use by all users, and requests the user to utter the information for the uninput item with respect to the selected service.

When there is a service for which the uttered information is stored for all of the indispensable input items, the service can be provided to the user.

With the service providing system 100 in the embodiment described above, it is possible to provide a service desired by the user, which is led by the system, while specifying uninput items based on the information uttered by the user and requesting the user to utter the information for the uninput items. This enables improvement in convenience for the user.

MODIFICATION

The disclosure is not limited to the embodiment described above and can be implemented in various other forms without departing from the gist of the invention. Accordingly, the embodiment described above is merely illustrative in all respects and is not to be construed as restrictive. For example, the processes described above can be optionally changed in order or executed in parallel as long as there is no inconsistency in processing content.

In the case where the user utters words after the providing unit 25 according to the embodiment described above provides the service to the user, the providing unit 25 may change the service to be provided to the user based on the uttered information. For example, in the case where the user utters words related to a destination or means of transportation after the user registers their schedule using the schedule management service, it can be assumed that the user desires the navigation service instead of the schedule management service. In such cases, the providing unit 25 may provide a travel route guidance as a navigation service.

When there are a plurality of services having the highest score calculated by the calculation unit 23, the request unit 24 according to the embodiment described above selects either one of (a) and (b) described above and requests the user to utter the information for the uninput item with respect to the selected service. However, the condition for the above process is not limited to a case in which there are a plurality of services having the highest score. For example, the request unit 24 may select, among the plurality of the services, either one of (a) and (b) described above as the service desired by the user regardless of the score, and request the user to utter the information for the uninput item with respect to the selected service.

The service providing device 2 in the embodiment described above includes the specifying unit 21, the storage unit 22, the calculation unit 23, the request unit 24, the providing unit 25, and the adjusting unit 26 as a functional configuration. However, the invention is not limited thereto, and any function can be appropriately deleted or added as necessary. For example, the providing unit 25 and the adjusting unit 26 may be incorporated in a device different from the service providing device 2, or a voice recognition function of the voice recognition device 3 may be incorporated in the service providing device 2.

What is claimed is:

1. A service providing device that identifies a user's voice and provides a service based on the user's voice, the service providing device comprising a control unit comprising a CPU and a memory, the control unit is configured to:
   store, for each service, a plurality of input items required for providing the service to the user and individual weighting factors assigned to the corresponding input items;
   specify, based on uttered information uttered by the user, the input items for which the uttered information is stored;
   store the uttered information for the input items specified by the specifying unit;
   calculate a score for each service based on all of the input items for which the uttered information is stored and the individual weighting factors assigned to the corresponding input items; and
   request the user, when there is an uninput item for which the uttered information has not been stored with respect to the service having the highest score calculated by the calculation unit, to utter information for the uninput item, wherein
   when there are a plurality of the services having the highest score calculated, the control unit is configured requests the user to utter the information for the uninput item with respect to either one of a service having the least number of uninput items in indispensable input items, among the input items, for which input is indispensable, and a service having the highest ratio of input items input compared to the total number of the indispensable input items for that particular service, among the plurality of services.

2. The service providing device according to claim 1, wherein the control unit is further configured to request the user, when there are a plurality of the services having the least number of uninput items in the indispensable input items or when there are a plurality of the services having the highest ratio of input for the indispensable input items, to utter the information for the uninput item with respect to a service having the highest priority within priorities set for each service among the plurality of the services.

3. The service providing device according to claim 2, wherein the control unit is further configured to set the priority of the service for which utterance is requested to be lower than the priorities of other services, when a user answer from the user in response to a request of utterance differs from an answer assumed.

4. The service providing device according to claim 1, wherein the control unit is further configured to request the user, when there are a plurality of the services having the least number of uninput items in the indispensable input items or when there are a plurality of the services having the highest ratio of input for the indispensable input items, to utter the information for the uninput item with respect to a service having the highest priority within priorities of the services set for each type of terminal used by the user among the plurality of the services.

5. The service providing device according to claim 4, wherein the control unit is further configured to set the priority of the service for which utterance is requested to be lower than the priorities of other services, when a user answer from the user in response to a request of utterance differs from an answer assumed.

6. The service providing device according to claim 1, wherein the control unit is further configured to request the user, when there are a plurality of the services having the least number of uninput items in the indispensable input items or when there are a plurality of the services having the highest ratio of input for the indispensable input items, to utter the information for the uninput item with respect to a service having the highest number of records of use by the user among the plurality of the services.

7. The service providing device according to claim 1, wherein the control unit is further configured to request the user, when there are a plurality of the services having the least number of uninput items in the indispensable input items or when there are a plurality of the services having the highest ratio of input for the indispensable input items, to utter the information for the uninput item with respect to a service having the most recent record of use by the user among the plurality of the services.

8. The service providing device according to claim 1, wherein the control unit is further configured to request the user, when there are a plurality of the services having the least number of uninput items in the indispensable input items or when there are a plurality of the services having the highest ratio of input for the indispensable input items, to utter the information for the uninput item with respect to a service having the highest number of records of use by all users among the plurality of the services.

9. The service providing device according to claim 1, wherein the control unit is further configured to provide, when there is a service for which the uttered information is stored with respect to all of the indispensable input items, the service to the user.

10. The service providing device according to claim 1, wherein the service includes a service in which a schedule is registered in a schedule table of the user or a service in which a navigation screen is displayed on an information terminal of the user to provide a travel route guidance.

11. A non-transitory computer-readable storage medium storing a service providing program for providing a service to a user, the service providing program causing a computer to:
   identify a user's voice and store, for each service, a plurality of input items required for providing the service based on the user's voice and individual weighting factors assigned to the corresponding input items;
   specify, based on uttered information uttered by the user, the input items for which the uttered information is stored; store the uttered information for the input items specified;
   calculate a score for each service based on all of the input items for which the uttered information is stored and the individual weighting factors assigned to the corresponding input items; and
   request the user, when there is an uninput item for which the uttered information has not been stored with respect to the service having the highest score calculated, to utter information for the uninput item, wherein
   when there are a plurality of the services having the highest score calculated, the computer requests the user to utter the information for the uninput item for either one of a service having the least number of uninput items in indispensable input items, among the input items, for which input is indispensable, and a service having the highest ratio of input items input compared to the total number of the indispensable input items for that particular service, among the plurality of services.

12. A service providing method that identifies a user's voice and provides a service based on the user's voice through a service providing device, the service providing method comprising:

selecting, as a desired service desired by the user, either one of a service having the least number of uninput items in indispensable input items for which input is indispensable, and a service having the highest ratio of input items input compared to the total number of the indispensable input items for that particular service, among the plurality of services, based on information uttered by a user; and requesting the user to utter the information for the uninput items, wherein the service providing device comprises a control unit comprising a CPU and a memory, and the control unit is configured to:

store, for each service, a plurality of input items required for providing the service to the user and individual weighting factors assigned to the corresponding input items;

specify, based on uttered information uttered by the user, the input items for which the uttered information is stored;

store the uttered information for the input items specified by the specifying unit;

calculate a score for each service based on all of the input items for which the uttered information is stored and the individual weighting factors assigned to the corresponding input items; and request the user, when there is an uninput item for which the uttered information has not been stored with respect to the service having the highest score calculated by the calculation unit, to utter information for the uninput item.

\* \* \* \* \*